(12) United States Patent
Miller

(10) Patent No.: US 9,716,380 B2
(45) Date of Patent: Jul. 25, 2017

(54) CONTROLLED POWER-UP SCHEME FOR AN ELECTRONIC TRIP UNIT, AND CIRCUIT INTERRUPTER EMPLOYING SAME

(71) Applicant: EATON CORPORATION, Cleveland, OH (US)

(72) Inventor: Theodore James Miller, Oakdale, PA (US)

(73) Assignee: EATON CORPORATION, Cleveland, OH (US)

(*) Notice: Subject to any disclaimer, the term of this patent is extended or adjusted under 35 U.S.C. 154(b) by 148 days.

(21) Appl. No.: 14/840,127

(22) Filed: Aug. 31, 2015

(65) Prior Publication Data

US 2017/0063072 A1    Mar. 2, 2017

(51) Int. Cl.
| | |
|---|---|
| H02H 3/00 | (2006.01) |
| H02H 3/087 | (2006.01) |
| H02H 3/08 | (2006.01) |
| H02M 3/04 | (2006.01) |
| H02M 1/36 | (2007.01) |
| H02H 1/00 | (2006.01) |
| B60L 3/04 | (2006.01) |

(52) U.S. Cl.
CPC .......... *H02H 3/087* (2013.01); *H02H 3/08* (2013.01); *H02M 1/36* (2013.01); *H02M 3/04* (2013.01); *B60L 3/04* (2013.01); *H02H 1/0015* (2013.01)

(58) Field of Classification Search
USPC ............................................... 361/42–50
See application file for complete search history.

(56) References Cited

U.S. PATENT DOCUMENTS

| | | | |
|---|---|---|---|
| 3,806,764 A * | 4/1974 | Hobson, Jr. ............ | H02H 3/347 361/48 |
| 5,341,191 A | 8/1994 | Crookston et al. | |
| 5,910,760 A | 6/1999 | Malingowski et al. | |
| 6,144,271 A | 11/2000 | Mueller et al. | |
| 6,850,135 B1 | 2/2005 | Puskar et al. | |
| 7,859,802 B2 * | 12/2010 | Davison ................. | H01H 71/22 355/44 |
| 2008/0055795 A1 | 3/2008 | Miller | |

* cited by examiner

*Primary Examiner* — Danny Nguyen
(74) *Attorney, Agent, or Firm* — Eckert Seamans; Philip Levy; Grant Coffield

(57) ABSTRACT

A power supply circuit for a trip unit of a circuit interrupter includes a current transformer, a startup circuit receiving a regulated voltage and a DC/DC converter. The startup circuit is structured to: (i) burden the current transformer with an impedance approximating the trip unit and cause the DC/DC converter to enter the shutdown mode when the regulated voltage is below a predetermined value, (ii) remove the burden and cause the DC/DC converter to exit the shutdown mode and provide power to the trip unit responsive to the regulated voltage reaching the predetermined value, and (iii) remove the burden and cause the DC/DC converter to exit the shutdown mode and provide power to the trip unit responsive to a rate of change of the regulated voltage being at least a predetermined level.

11 Claims, 2 Drawing Sheets

CONTROLLED POWER-UP SCHEME FOR AN ELECTRONIC TRIP UNIT, AND CIRCUIT INTERRUPTER EMPLOYING SAME

BACKGROUND

Field

This invention pertains generally to circuit interrupters and, more particularly, to circuit interrupters including a trip unit and a power supply. The invention also relates to a power supply start-up circuit for a circuit interrupter trip unit.

Background Information

Circuit breakers and circuit breaker trip units are well known in the art. See, for example, U.S. Pat. Nos. 5,910,760; 6,144,271; and 6,850,135.

Circuit breaker trip units require power for both energizing and tripping the trip actuator of the trip unit and energizing the signal processing circuitry of the trip unit Power for trip units is typically provided by an iron core current transformer (CT), which may or may not also provide primary current indication (i.e., the current indication used for monitoring for overcurrent conditions). Generally, this CT is regulated to provide a relatively large output voltage to a capacitor which stores energy that is needed to energize and trip the trip actuator of the trip unit. Because this CT is capable of supplying only a certain amount of power, a relatively efficient switching power supply is preferred over a relatively less efficient linear regulator to convert the capacitor voltage to a relatively smaller voltage supply (at a relatively higher current) for the signal processing circuitry of the trip unit. Preferably, current-powered trip units run at the lowest possible CT primary current, or equivalently at the lowest possible load current flowing through the circuit breaker. This is desirable for both display/metering purposes and for protection purposes.

A conventional switching regulator integrated circuit may be electrically connected to receive the capacitor voltage. However, this configuration does not provide the lowest possible current power-up of the trip unit.

Given a fixed load requirement and being approximately constant power devices, all switching regulators draw more input current from their input power supply at a relatively lower input voltage than at a relatively higher input voltage. Therefore, for a current-limited source, such as a CT secondary when operated at relatively low primary current, the switching regulator starting at its minimum operating voltage will require greater input supply current than a regulator starting at a higher voltage. At relatively low primary current, the current output of CT secondary is limited by the CT primary current divided by the number of secondary turns even though its voltage output in an unloaded state can be quite high. In other words the CT is a current source providing large voltage and limited current. The switching regulator as a load requires decreasing current with increasing input voltage. There is a need to balance these two facts.

Accordingly, there is room for improvement in circuit interrupters and in power supplies for trip units.

SUMMARY

These needs and others are met by embodiments of the disclosed concept, which are, in one implementation, directed to a power supply circuit for a trip unit of a circuit interrupter that includes a current transformer structured to provide a voltage indicative of a primary current flowing through the circuit interrupter, a rectifier and regulator structured to rectify and regulate the voltage from the current transformer and output a regulated voltage, a startup circuit structured to be powered by the regulated voltage, and a DC/DC converter coupled to an output of the startup circuit for receiving the regulated voltage, wherein the DC/DC converter has a shutdown mode. The startup circuit includes a burden impedance, a switch electrically connected in series with the burden impedance. The startup circuit is structured to: (i) burden the current transformer through the series combination of the switch and the burden impedance and cause the DC/DC converter to enter the shutdown mode when the regulated voltage is below a predetermined value, (ii) remove the burden and cause the DC/DC converter to exit the shutdown mode and provide power to the trip unit responsive to the regulated voltage reaching the predetermined value, and (iii) remove the burden and cause the DC/DC converter to exit the shutdown mode and provide power to the trip unit responsive to a rate of change of the regulated voltage being at least a predetermined level.

In another implementation, a method of powering a trip unit of a circuit interrupter is provided. The method includes providing a voltage indicative of a primary current flowing through the circuit interrupter from a secondary of a current transformer, rectifying and regulating the voltage from the secondary of the current transformer and outputting a regulated voltage, providing the regulated voltage to a DC/DC converter, the DC/DC converter having a shutdown mode, burdening the current transformer with a burden impedance and causing the DC/DC converter to enter the shutdown mode when the regulated voltage is below a predetermined value, removing the burden and causing the DC/DC converter to exit the shutdown mode and provide power to the trip unit responsive to the regulated voltage reaching the predetermined value, and removing the burden and causing the DC/DC converter to exit the shutdown mode and provide power to the trip unit responsive to a rate of change of the regulated voltage being at least a predetermined level.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
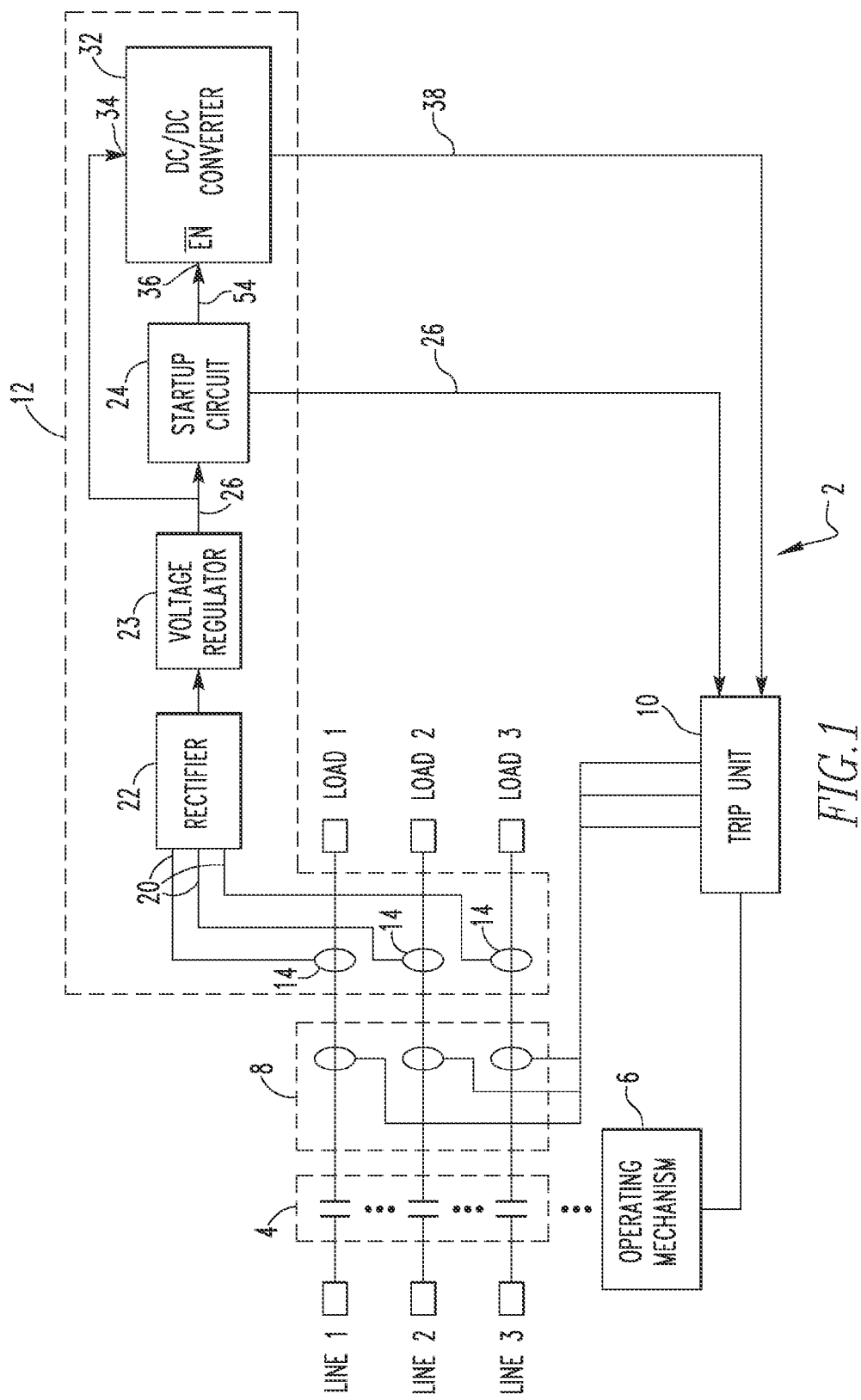
FIG. 1 is a schematic diagram of a circuit interrupter according to an exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the statement that a part is "electrically interconnected with" one or more other parts shall mean that the parts are directly electrically connected together or are electrically connected together through one or more electrical conductors or generally electrically conductive intermediate parts. Further, as employed herein, the statement that a part is "electrically connected to" one or more other parts shall mean that the parts are directly electrically connected together or are electrically connected together through one or more electrical conductors.

The invention is described in association with a three-pole circuit breaker, although the invention is applicable to a wide range of circuit interrupters having any number of poles.

Referring to FIG. 1, a circuit interrupter, such as three-pole circuit breaker 2, includes separable contacts 4, an operating mechanism 6 structured to open and close the separable contacts 4, a sensor 8 structured to sense current flowing through the separable contacts 4, a trip unit 10 cooperating with the sensor 8 and the operating mechanism 6 to trip open the separable contacts 4, and a power supply 12 for the trip unit 10. In this example, the three-pole circuit breaker 2 includes three separable contacts 4 and three Rogowski coil or di/dt sensors 8 for sensing the three-phase current flowing through the separable contacts 4, although any suitable current sensor may be employed.

The power supply 12 includes a current transformer (CT) 14 for each pole having a single turn primary coil and a plural turn secondary coil including a secondary voltage 20. The secondary voltage is generated by switching the current output of the CT between a diode/capacitor combination and a shorting FET. A rectifier (e.g., a full-wave rectifier (FWR)) 22 is structured to rectify the CT secondary voltage 20. The rectifier 22 includes an input electrically interconnected with the CT secondary and an output coupled to a voltage regulator 23. The voltage regulator 23 outputs a regulated voltage 26.

The power supply 12 further includes a startup circuit 24 that is electrically interconnected with a DC/DC converter 32, such as a switching regulator. Startup circuit 24 is structured to monitor the power available from CT 14 and only allow trip unit 10 to start when sufficient power is available. In particular, as described in greater detail herein, CT 14 is burdened by a load that is electrically equivalent to that of the operating trip unit 10. When a predetermined voltage is reached, it is known that sufficient power is available to run trip unit 10. No shutdown of trip unit 10 will occur as sufficient available power has already been confirmed. Thus, the disclosed concept provides a startup circuit 24 that is structured to allow the higher voltages needed for operation of trip unit 24 to develop so that DC/DC converter 32 and therefore trip unit 10 are able to start up and run continuously at lower primary currents. DC/DC converter 32 includes an input 34 powered from the regulated voltage 26, an enable pin 36, and an output 38 (e.g., ±5 V) structured to power the signal processing electronics of trip unit 10.

Figure 2:
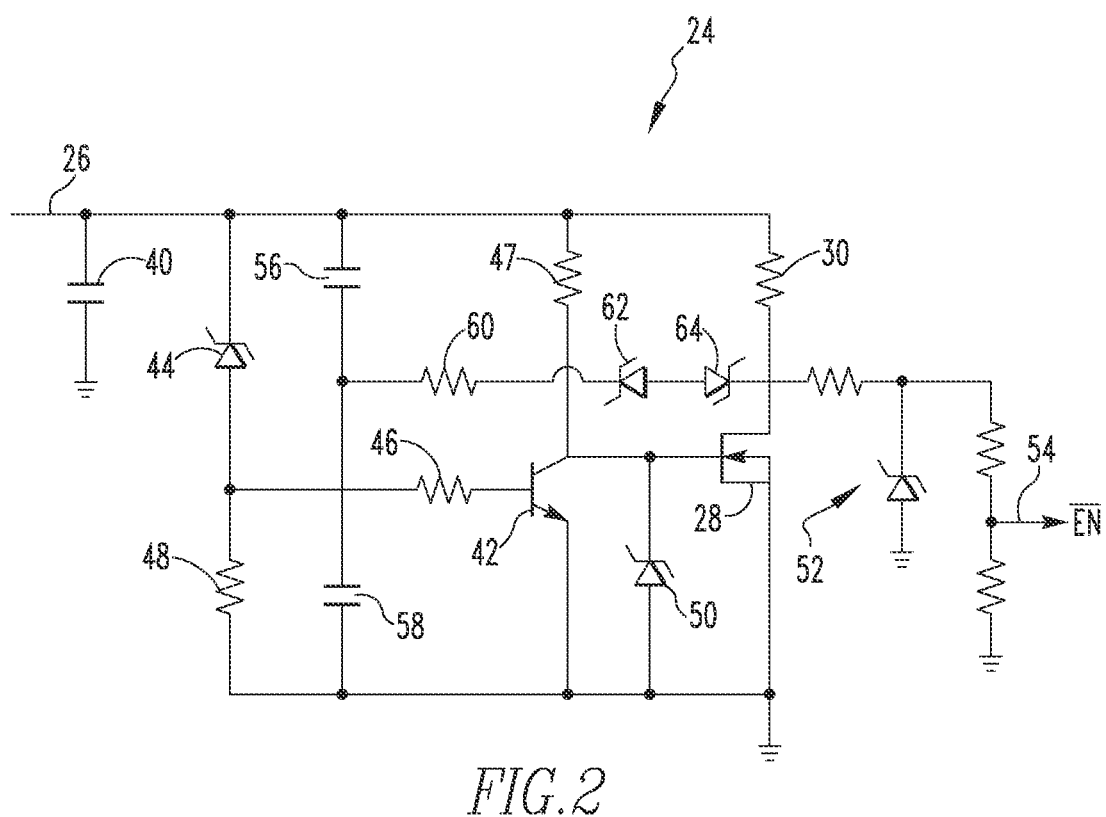
FIG. 2 is a circuit diagram of a startup circuit forming part of the circuit interrupter of FIG. 1 according to one exemplary embodiment.

FIG. 2 is a circuit diagram of startup circuit 24 according to an exemplary embodiment of the disclosed concept. As seen in FIG. 2, startup circuit 24 is powered by the regulated voltage 26 and includes a capacitor 40, which in the exemplary embodiment is a 47 uF capacitor, that is provided between the line carrying the regulated voltage 26 and ground. Among other functions (described herein), capacitor 40 supplies the energy (in the form of regulated voltage 26) needed by the trip actuator of circuit breaker 2. Startup circuit 24 further includes a switch, such as a field effect transistor (FET) 28, that is electrically connected in series with a burden impedance, such as a resistor 30. As seen in FIG. 2, the series combination of FET 28 and resistor 30 is connected in parallel with capacitor 40. The collector of an NPN bipolar junction transistor (BJT) 42 is connected to the gate of FET 28. The base of BJT 42 is coupled to the anode of a zener diode 44 through a current limiting resistor 46, and the collector of BJT 42 is connected to the line carrying the regulated voltage 26 through current limiting resistor 47. In the exemplary embodiment, zener diode 44 is a 10 V zener diode. The anode of zener diode 44 is also connected to ground through a resistor 48. The cathode of zener diode 44 is connected to the line carrying the regulated voltage 26. A zener diode 50 is provided between the gate of FET 30 and ground and acts as a clamp to make sure the gate of FET 30 does not see an overvoltage. A voltage divider circuit 52 is connected to the drain of FET 30. An enable line 54, which provides an enable signal to the enable pin 36 of DC/DC converter 32, is coupled to voltage divider circuit 52 as shown. Voltage divider circuit 52 makes sure that enable signal 54 is at the right level for input 36 of the DC/DC converter 32. Startup circuit 24 also includes a capacitor 56 (which in the exemplary embodiment is a 0.01 uF capacitor) and capacitor 58, which are provided in series between the line carrying regulated voltage 26 and ground. A series connection of a resistor 60, a diode 62 (which may be a standard silicon diode or a zener diode), and a zener diode 64 is connected between the point of interconnection of capacitors 56 and 58 and the voltage divider circuit 52. As seen in FIG. 2, the anodes of zener diodes 62, 64 are directly connected to one another. The function and operation of all of these components is described elsewhere herein.

It is important to note that the current requirement from the signal provided to input 34 decreases as the voltage of the signal provided to input 34 increases because of the DC/DC converter 32 providing the +5 V. Without the startup circuit 24, as primary current increases, the voltage at the signal provided to input 34 will rise rapidly at the CT is unburdened. With inadequate current available, the DC/DC converter 34 will be unable to support its output voltage and will rapidly shut back down. This cycle will continue (start-up/shutdown) until the primary current reaches high enough current to support operation. Referring again to FIG. 1, given a predetermined primary current for the CT 14 that supplies power to the trip unit 10, enough secondary current may be available at relatively higher CT secondary voltages if those voltages are given time to develop. The disclosed power supply 12 allows those relatively higher CT secondary voltages to develop, in order that the switching regulator 32 and, therefore, the trip unit 10 are both able to "startup" at a relatively lower CT primary current.

This is accomplished by initially (at relatively very low primary current) burdening the secondary of CT 14 with the resistive load of burden resistor 30 rather than with the DC/DC converter 32 and the trip unit 10. As described above, this resistive load is electrically interconnected with the secondary of CT 14 by the FET 28 tied to circuit ground. The resistance of the burden resistor 30 is selected such that its power dissipation at minimum operating conditions is equal to or slightly greater than that of the trip unit 10 operating under the same conditions. In the exemplary embodiment, zener diode 44 is used to sense when the regulated voltage 26 reaches a predetermined level which is sufficient to power the trip unit 10. At that point, the FET 28 is turned off, which removes the resistive burden of resistor 30 and takes DC/DC converter 32 out of its shutdown mode. As a result, the trip unit 10 "starts-up" cleanly at a relatively lower primary current than without such a circuit and without any "false starts" as described above.

More specifically, referring to FIG. 2, as the voltage on capacitor 40 rises from zero, FET 28 turns on very early (around 2 V on capacitor 40). FET 28 being on makes the signal on enable line 54 low, which holds DC/DC converter 32 in shutdown mode. Also, as described elsewhere herein, current through resistor 30 controls the voltage of the secondary of CT 14. When the voltage on capacitor 40 rises high enough, the 10 V zener diode 44 breaks over. This turns on BJT 42, which turns off FET 28. FET 28 being off makes the signal on enable line 54 high, which turns on the DC/DC converter 32 (takes is out of shutdown mode). Choosing resistor 30 properly will guarantee that when FET 28 turns off, CT 14 will be able to supply enough energy to keep trip unit 10 running. Without this proper choice, capacitor 40 will quickly discharge and trip unit 10 will shut down. Zener diode 64 provides hysteretic feedback to keep DC/DC converter 32 on at lower voltages on capacitor 40, and zener diode 62 is a blocking diode that makes sure the hysteresis works in only one direction. This hysteresis ensures that the converter will not shut down as soon as a trip signal is issued and the voltage on capacitor 40 gets pulled down.

In high fault situations, there is sufficient current available to turn on trip unit 10. However, waiting for capacitor 40 to charge to a point above the break over threshold of zener diode 44 (thereby enabling DC/DC converter 32 and starting trip unit 10 as described) may compromise trip time performance. This situation is addressed in the disclosed concept by providing capacitor 56 described above, which is coupled to the line/node that carries the regulated voltage 26. Capacitor 56 is responsive to the change in voltage on the line/node that carries the regulated voltage 26. In high fault situations, this voltage will rise rapidly. The current flowing through capacitor 56 will increase in direct proportion to this rapidly rising voltage. This proportional current will be injected into the base of BJT 42, which in turn will turn FET 30 off, thereby enabling DC/DC converter 32. By choosing the right value for capacitor 56, startup circuit 24 can be triggered earlier in such high fault conditions, i.e., at a lower voltage on the line/node that carries the regulated voltage 26. In other words, at high currents, DC/DC converter 32 will be allowed to start if the voltage is increasing quickly enough. This earlier triggering is acceptable and desirable because the rapid dv/dt on the line/node that carries the regulated voltage 26 is an indication that sufficient current is available to start and that rapid trip times may be required.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A power supply circuit for a trip unit of a circuit interrupter, comprising:
   a current transformer structured to provide a voltage indicative of a primary current flowing through the circuit interrupter;
   a rectifier structured to rectify the voltage from the current transformer and output a rectified voltage;
   a regulator structured to: (i) provide a regulated voltage from the rectified voltage and (ii) supply energy to a trip actuator;
   a startup circuit structured to be powered by the regulated voltage; and
   a DC/DC converter coupled to an output of the startup circuit for receiving the regulated voltage, the DC/DC converter having a shutdown mode;
   wherein the startup circuit includes a burden impedance, a switch electrically connected in series with the burden impedance, and wherein the startup circuit is structured to: (i) burden the current transformer through the series combination of the switch and the burden impedance and cause the DC/DC converter to enter the shutdown mode when the regulated voltage is below a predetermined value, (ii) remove the burden and cause the DC/DC converter to exit the shutdown mode and provide power to the trip unit responsive to the regulated voltage reaching the predetermined value, and (iii) remove the burden and cause the DC/DC converter to exit the shutdown mode and provide power to the trip unit responsive to a rate of change of the regulated voltage being at least a predetermined level.

2. The power supply circuit according to claim 1, wherein the startup circuit includes a capacitor coupled to the switch, the capacitor being structured to receive the regulated voltage and provide a current to the switch that causes the DC/DC converter to exit the shutdown mode when the rate of change of the regulated voltage is at least a predetermined level.

3. The power supply circuit according to claim 1, wherein the burden impedance is structured to approximate an impedance of the trip unit.

4. The power supply circuit according to claim 3, wherein the burden impedance comprises a resistor.

5. The power supply circuit according to claim 1, wherein the switch is a field effect transistor including a drain electrically connected to the burden impedance.

6. The power supply circuit according to claim 5, wherein the DC/DC converter includes and enable input, wherein the drain is electrically connected to the enable input, and wherein the shutdown mode is maintained when the field effect transistor is on.

7. The power supply circuit according to claim 6, wherein the startup circuit further includes a zener diode (44) electrically connected to a second switch, wherein the second switch is coupled to a gate of the field effect transistor, wherein the zener diode is structured to receive the regulated voltage, and wherein the zener diode is structured to break down at the predetermined value and cause the field effect transistor to be turned off, thereby causing the DC/DC converter to exit the shutdown mode.

8. A circuit interrupter, comprising:
   a number of separable contacts;
   an operating mechanism structured to open and close the number of separable contacts;
   a sensor structured to sense current flowing through the number of separable contacts;
   a trip unit cooperating with the sensor and the operating mechanism to trip open the separable contacts; and
   a power supply according to claim 1 structured to provide power to the trip unit.

9. A method of powering a trip unit of a circuit interrupter, comprising:
   providing a voltage indicative of a primary current flowing through the circuit interrupter from a secondary of a current transformer;
   rectifying and regulating the voltage from the secondary of the current transformer and outputting a regulated voltage;
   providing the regulated voltage to a DC/DC converter, the DC/DC converter having a shutdown mode;

burdening the current transformer with a burden impedance and causing the DC/DC converter to enter the shutdown mode when the regulated voltage is below a predetermined value;

removing the burden and causing the DC/DC converter to exit the shutdown mode and provide power to the trip unit responsive to the regulated voltage reaching the predetermined value; and removing the burden and causing the DC/DC converter to exit the shutdown mode and provide power to the trip unit responsive to a rate of change of the regulated voltage being at least a predetermined level.

10. The method according to claim 9, wherein the burden impedance is structured to approximate an impedance of the trip unit.

11. The method according to claim 10, wherein the burden impedance comprises a resistor.

* * * * *